United States Patent
Waller et al.

(10) Patent No.: US 10,353,654 B1
(45) Date of Patent: Jul. 16, 2019

(54) APPLICATION INTEGRATION MECHANISM

(71) Applicants: Marquis G. Waller, Beverly, OH (US); Gerald Donald Boldt, Longmont, CO (US); Minh Trong Vo, Broomfield, CO (US); Joseph Wayne Stradling, Firestone, CO (US); Tadao Yamasaki, Boulder, CO (US)

(72) Inventors: Marquis G. Waller, Beverly, OH (US); Gerald Donald Boldt, Longmont, CO (US); Minh Trong Vo, Broomfield, CO (US); Joseph Wayne Stradling, Firestone, CO (US); Tadao Yamasaki, Boulder, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/966,772

(22) Filed: Apr. 30, 2018

(51) Int. Cl.
*G06F 3/12* (2006.01)

(52) U.S. Cl.
CPC .......... *G06F 3/1246* (2013.01); *G06F 3/1206* (2013.01); *G06F 3/1207* (2013.01); *G06F 3/1245* (2013.01); *G06F 3/1247* (2013.01); *G06F 3/1287* (2013.01)

(58) Field of Classification Search
CPC ................. G06F 3/1247; G06F 3/1245; G06F 3/1244–1248; G06F 3/1256; G06F 3/1207
See application file for complete search history.

(56) References Cited

U.S. PATENT DOCUMENTS

| | | | | |
|---|---|---|---|---|
| 6,360,252 B1* | 3/2002 | Rudy | ...................... | G06Q 10/10 709/206 |
| 6,369,909 B1* | 4/2002 | Shima | ................... | G06F 3/1206 358/1.13 |
| 6,940,615 B1* | 9/2005 | Shima | ................... | G06F 3/1206 358/1.15 |
| 8,489,980 B2* | 7/2013 | Lakritz | ................... | G06F 15/00 704/2 |
| 8,508,768 B2* | 8/2013 | Sekine | ................... | G06Q 10/10 358/1.1 |
| 9,207,887 B1* | 12/2015 | Lahey | ................... | G06F 3/1208 |

(Continued)

OTHER PUBLICATIONS

Maxwell, A. JDF in the Inter-Enterprise Workflow Achieving JDF workflow automation. Retrieved from https://theartofservicelab.s3.amazonaws.com/All%20Toolkits/The%20Managed%20Service%20Provider%20Toolkit/Act%20%20Recommended%20Reading/Utilize%20A%20Managed%20Service%20Provider.ppt on Jan. 12, 2018, 15 pages.

(Continued)

*Primary Examiner* — Ted W Barnes
(74) *Attorney, Agent, or Firm* — Jaffery Watson Mendonsa & Hamilton LLP

(57) ABSTRACT

A system to is described. The system includes at least one physical memory device to store application integration logic and one or more processors coupled with the at least one physical memory device, the one or more processors to execute the application integration logic to provide an interface between a print manager and one or more client devices supporting a plurality of language formats and to convert print job instructions from the plurality of language formats to a language format supported by the print manager and allow the print manager to communication status back on the print job in its own language and have that converted in to the language the client device understands.

16 Claims, 7 Drawing Sheets

(56) References Cited

U.S. PATENT DOCUMENTS

| | | | | |
|---|---|---|---|---|
| 9,417,829 B2* | 8/2016 | Sheldon | | G06Q 10/0631 |
| 9,448,752 B2* | 9/2016 | Giannetti | | G06F 3/1204 |
| 2001/0013947 A1* | 8/2001 | Van Der Linden | | G06Q 10/1053 358/1.15 |
| 2004/0036908 A1* | 2/2004 | Yagita | | G06F 3/121 358/1.15 |
| 2005/0068574 A1* | 3/2005 | Ferlitsch | | G06F 3/122 358/1.15 |
| 2005/0225789 A1* | 10/2005 | Ferlitsch | | G06F 3/1204 358/1.13 |
| 2006/0221391 A1* | 10/2006 | Okazawa | | G06F 3/1204 358/1.15 |
| 2007/0236723 A1* | 10/2007 | Gaertner | | G06F 3/1208 358/1.15 |
| 2007/0296996 A1* | 12/2007 | Hiromachi | | G06F 3/1206 358/1.13 |
| 2008/0137133 A1* | 6/2008 | Trappe | | G06F 3/1204 358/1.15 |
| 2010/0100588 A1* | 4/2010 | Huster | | H04L 67/02 709/203 |
| 2010/0214603 A1* | 8/2010 | Tamura | | G06F 9/4411 358/1.15 |
| 2010/0225959 A1* | 9/2010 | Selvaraj | | G06F 3/1204 358/1.15 |
| 2011/0128563 A1* | 6/2011 | Rupe | | G06F 3/1206 358/1.13 |
| 2011/0194135 A1* | 8/2011 | Hamilton | | G06F 3/1208 358/1.14 |
| 2011/0235085 A1* | 9/2011 | Jazayeri | | G06F 3/1204 358/1.14 |
| 2011/0242583 A1* | 10/2011 | Ray | | G06F 3/121 358/1.15 |
| 2012/0212757 A1* | 8/2012 | Gaertner | | G06F 3/1206 358/1.13 |
| 2012/0243026 A1* | 9/2012 | Waller | | G06F 3/1207 358/1.15 |
| 2013/0016389 A1* | 1/2013 | Robinson | | G06F 3/1206 358/1.15 |
| 2013/0215451 A1* | 8/2013 | Tsongas | | G06F 3/1248 358/1.15 |
| 2014/0002845 A1* | 1/2014 | Gutnik | | G06F 21/608 358/1.14 |
| 2014/0063522 A1* | 3/2014 | Kobayashi | | G06F 3/1207 358/1.13 |
| 2014/0368859 A1* | 12/2014 | Gutnik | | G06F 3/1206 358/1.14 |
| 2016/0231968 A1* | 8/2016 | Bracher | | B42C 19/02 |
| 2016/0259602 A1* | 9/2016 | Dalaa | | G06F 3/1204 |
| 2016/0344879 A1* | 11/2016 | Panda | | G06F 3/12 |
| 2017/0235531 A1* | 8/2017 | Yajima | | G06F 3/1247 358/1.18 |
| 2017/0277481 A1* | 9/2017 | Sako | | G06F 3/1206 |
| 2018/0011668 A1* | 1/2018 | Chai | | G06F 3/1206 |
| 2018/0285030 A1* | 10/2018 | Yokoohji | | G06F 3/1205 |
| 2018/0302521 A1* | 10/2018 | Thamizhanandan | | H04N 1/00498 |

OTHER PUBLICATIONS

Electronics for Imaging Inc. Fiery JDF. Retrieved from http://www.efi.com/products/fiery-servers-and-software/fiery-integration/fiery-jdf/overview/ on Jan. 12, 2018, 2 pages.

Xerox Corporation. FreeFlow® Core. Retrieved from https://www.xerox.com/digital-printing/workflow/freefow/core/enus.html on Jan. 12, 2018, 3 pages.

Koenig & Bauer. Workflow Solutions. Retrieved from https://www.koenig-bauer.com/en/service/sheetfed-solutions/productivity-service-complete/workflow-solutions/ on Jan. 12, 2018, 5 pages.

* cited by examiner

APPLICATION INTEGRATION MECHANISM

FIELD

This invention relates generally to the field of print services. More particularly, the invention relates to interfacing with a print services environment.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each assembly includes a printhead controller and a printhead (or array of printheads).

Recently, the establishment of infrastructures called cloud services in which services are provided by a server system connected to the Internet, has been in progress. Print services for printing over the Internet have also been provided. The services offer functions of generating and distributing print data with a server on the Internet in response to user interaction via a cloud application. Now, systems that provide such print services by using the aforementioned Cloud are being developed.

Such systems typically implement a communication interface. For instance, Job Definition Format (JDF), and its complementary messaging format, Job Messaging Format (JMF)) is fast becoming the communication of choice for various systems in a print production workflow. These systems include printers, inserters, folders, cutters, and printing software. However, the systems must also communicate with external systems that may implement other communication protocols. For example, external system clients may implement other JDF versions since there is no common JDF format among print system vendors.

Moreover, clients may access the cloud to request print services via other communication protocols, such as web services. Web services allow for information to be passed from one system to another with various metadata languages (e.g., Extensible Markup Language (XML), JavaScript Object Notation (JSON) messaging). Currently the only way to communicate with external system clients implementing web services, or other forms of JDF, via JMF is to generate a customized interface to communicate with the software language supported by each different system. However, generating different interfaces for each system is inefficient and results in unnecessary costs.

Accordingly, an application interface mechanism that provides a single interface to support various external system language formats is desired.

SUMMARY

In one embodiment, a method is disclosed. The method includes receiving one or more print job orders from a client device including print job instructions to process one or more print jobs at a print job manager, wherein the one or more print jobs is comprised of a first language format, converting the print job instructions from the first language format to a second language format supported by the print job manager and transmitting the one or more print job instructions to the print job manager for processing the one or more print jobs according to the second language format.

In a further embodiment, a system is disclosed that includes one or more host servers to host a print manager to process print jobs according to a host language format, a plurality of client servers to submit orders including print job instructions to process one or more print jobs at a print job manager, wherein the print job instructions submitted by each client sever submits are comprised of different language formats, and one or more cloud servers to host application integration logic to provide an interface between the print manager and the plurality of client servers and to convert print job instructions from a language format associated with each client server to the host language format.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

An application integration mechanism that provides a single interface to support various external system language formats is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "interface", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
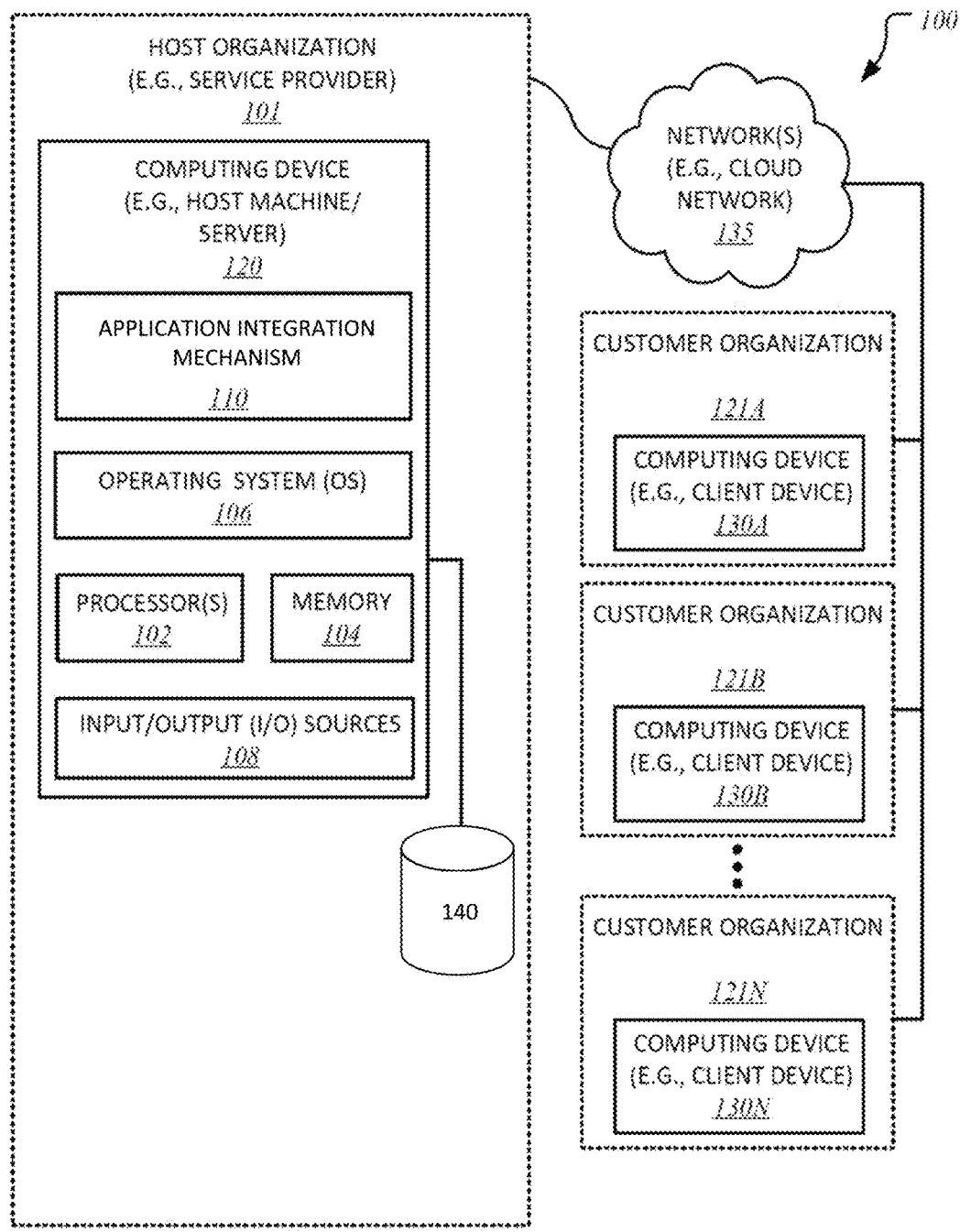
FIG. 1 illustrates a system having a computing device employing an application integration mechanism according to one embodiment.

FIG. 1 illustrates a system 100 having a computing device 120 employing an application integration mechanism 110 according to one embodiment. In one embodiment, computing device 120 includes a host server computer serving as a host machine for employing application integration mechanism 110 to provide an interface between printing service components of computing device 120 and a plurality of external system clients attempting to access the printing service components via software language formats that are different from the printing service components.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a print production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process documents and/or print jobs on behalf of customer organizations 121A-N. In some embodiments, host organization 101 receives input and other requests from a plurality of customer organizations 121A-N over one or more networks 135; for example, incoming print job and/or document processing requests, or other inputs may be received from customer organizations 121A-N to be processed using database system 140.

In one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc. In one embodiment, requests are received at, or submitted to, a web server within host organization 101. Host organization 101 may receive a variety of requests for processing by host organization 101. For example, incoming requests received at the web server may specify print services from host organization 101 are to be provided.

Figure 2:
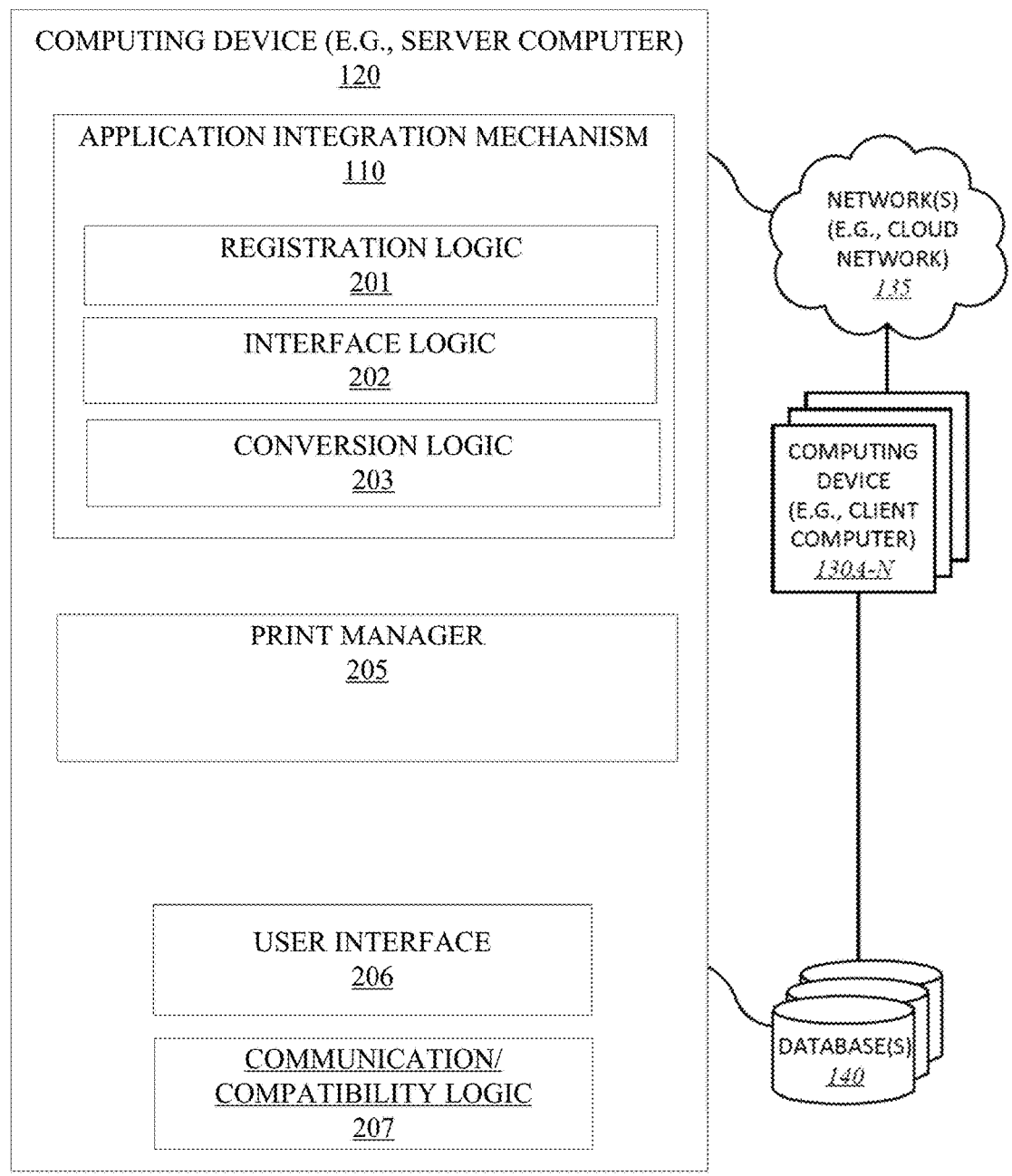
FIG. 2 illustrates an application integration mechanism according to one embodiment.

FIG. 2 illustrates application integration mechanism 110 of FIG. 1 according to one embodiment. In one embodiment, application integration mechanism 110 provides a web service that operates an interface between a print manager 205 and external systems, such as client computers 130. In such an embodiment, application integration mechanism 110 may include any number and type of components, such as registration logic 201, interface logic 202 and conversion logic 203. Additionally, computing device 120 includes other components, such as user interface 206 and communication/compatibility logic 207, to facilitate the implementation of application integration mechanism 110. For example, communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

Computing device 120 may include a server computer which may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 130A-N, over one or more networks, such as network(s) 135.

In one embodiment, computing device 120 may operate as a service provider core for hosting and maintaining application integration mechanism 110 as a software as a service (SaaS), and be in communication with one or more client computers 130A-N, over one or more network(s) 135, and any number and type of dedicated nodes.

According to one embodiment, computing device 120 may perform print services for client devices 130 via one or more printing systems. Thus, print manager 205 at computing device 120 communicates with one or more printing systems for the transmission of print jobs for printing. In one embodiment, print manager 205 provides print job management for document workflow to be handled at a printing system. In further embodiments, a print manager 205 interface may be implemented at other computing devices to perform print management.

Figure 3:
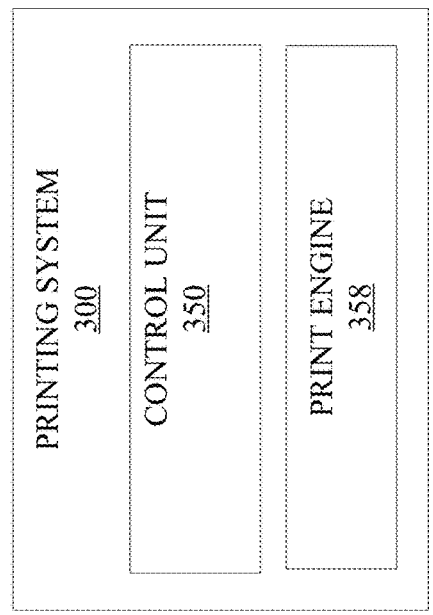
FIG. 3 illustrates one embodiment of a printing system.

FIG. 3 illustrates one embodiment of such a printing system 300. Printer 300 includes a control unit 350 and a print engine 358. According to one embodiment, control unit 350 processes and renders objects received in print job data and provides sheet maps for printing to print engine 358. Control unit (e.g., DFE or digital front end) 350 is implemented to process image objects received at control unit 350 by a raster image processor (RIP) to convert an image described in a vector graphics format (e.g., shapes) into a raster image (e.g., pixels) that is to be stored as scan line data in a memory array (not shown) for output to print engine 358. In embodiments, print engines 358 may be located at a facility associated with a customer organization 121. In such embodiments, control unit 350 processes print job information and transmits the raster images to remote print engines to produce the output.

Figure 4:
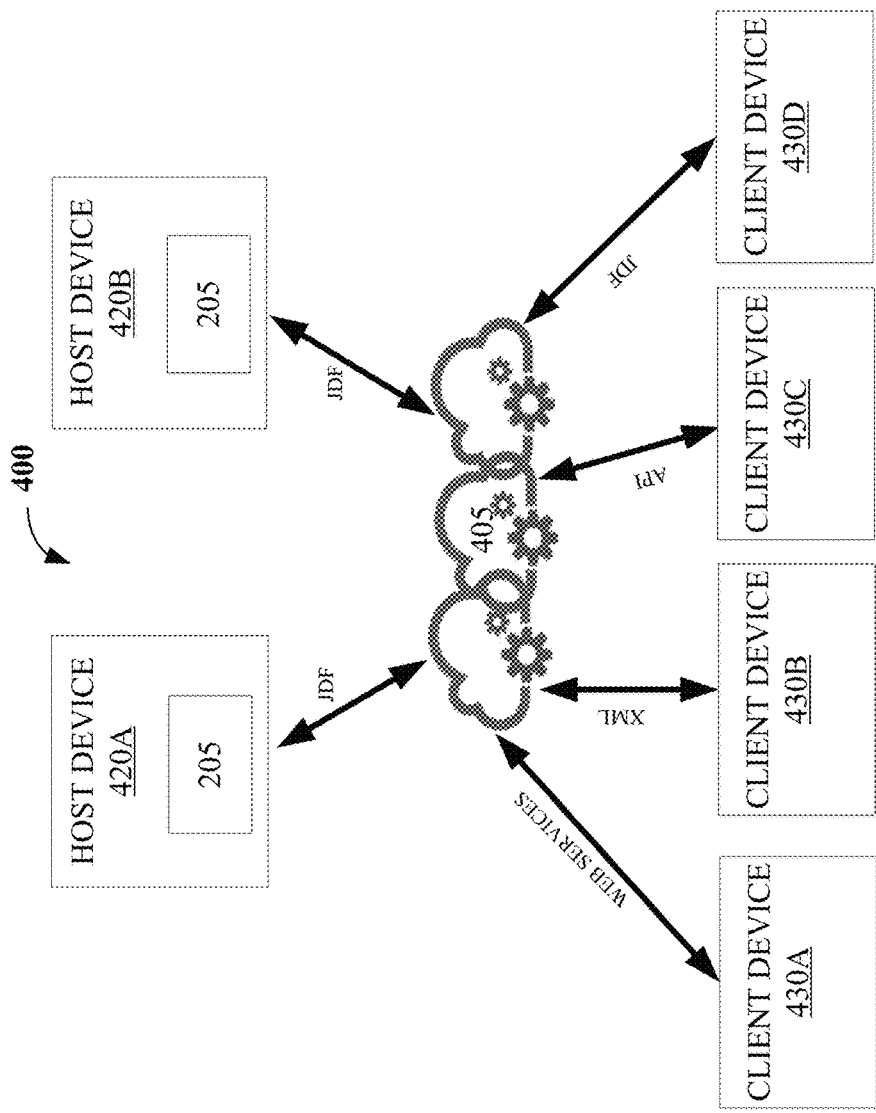
FIG. 4 illustrates another embodiment of an application integration implemented in a cloud computing environment.

Although shown as being implemented in the same computing device 120, other embodiments may feature print manager 205 and application integration mechanism 110 being implemented in separate computing devices 120. For instance, application integration mechanism 110 may be separately implemented in a cloud computing environment. FIG. 4 illustrates such an embodiment of application integration mechanism 110 implemented in a cloud computing environment 400. As shown in FIG. 4, environment 400 includes a cloud server 405 that communicates with host devices 420, each including a print manager 205, and client devices 430.

Referring back to FIG. 2, application integration mechanism 110 may be implemented to receive print job data from various external systems (e.g., clients 130) implementing different software language formats. These language formats may include different JDF formats, web services, JMF, Hot Folder, a private application programming interface (API), etc.

According to one embodiment, job tickets instructions corresponding to print job data (e.g., print job instructions) being provided is transformed (or converted) from a format (e.g., instruction language format) supported by the external systems to an instruction language format supported by print manager 205 (e.g., host language format). In such an embodiment, print job instructions may be included in a job ticket to provide instructions as to how a job is to be processed and/or printed. Additionally, the print job instructions may include a status request, as well as an indication as to how the status is to be delivered.

In one embodiment, a print job instruction language format is converted to a JDF format supported by print manager 205. However in other embodiments, the job instruction language may be converted to other formats (e.g., Open Document Format (ODF). In a further embodiment, application integration mechanism 110 may receive messages from print manager 205 that are to be transmitted to the external system. In this embodiment, application integration mechanism 110 converts the messages back into a call having the instruction language supported by the external system prior to transmission.

In one embodiment, registration logic 201 operates as a web service to provide for the registration of print manager 205 with external systems (e.g., client devices 430 shown in FIG. 4). In one embodiment, an external system may generate a print workflow (e.g., by a user via user interface 206) at print manager 205 that implements registration logic 201 to register the workflow. Interface logic 202 provides an interface for application integration mechanism 110 to communicate with external systems. In such an embodiment, interface logic 202 receives input calls from, and transmits messages to, client devices 430 based on an associated instruction language format implemented by the client device 430.

According to one embodiment, print manager 205 triggers interaction with a client device 430 by calling for interface logic 202 to query the client device 430. In this embodiment, interface logic 202 may query the client device 430 for one or more orders including one or more print jobs that are to be processed by print manager 205. As a result, interface logic 202 may receive an input call from the client device 430. Subsequently, jobs from the one or more orders are pushed to print manager 205 via interface logic 202. Once the jobs in the orders are processed, interface logic 202 may send a notification to the client device 430 as an indication that the print jobs have been printed.

Conversion logic 203 converts print job instructions corresponding to the received print jobs into the print manager supported format (e.g., JDF) and forwards the instructions to print manager 205 based on the supported messaging format (e.g., JMF). In a further embodiment, conversion logic 203 also converts the received input calls. For instance, conversion logic 203 may convert an input call from an XML format supported by client device 430 to an XML format supported by print manager 205.

According to one embodiment, conversion logic 203 determines a language format of the received call and performs a conversion to JMF based on the call language. In a further embodiment, conversion logic 203 performs the conversion by mapping attributes from the language format of the client device 430 to JDF attributes. For instance, conversion logic 203 may map XML attributes to the JDF attributes for clients 430 that support XML.

In yet a further embodiment, a library having a mapping of attributes for various languages supported by application integration mechanism 110 may be stored in databases 140. In this embodiment, conversion logic 203 accesses databases 140 to retrieve an applicable JDF mapping upon receiving print job instruction data via interface logic 202. Accordingly, conversion logic 203 enables a client device 430 to issue a call to print manager 205 in its native language format and have print manager 205 receive the call in its native language format (e.g., JDF). As shown in FIG. 4, client devices 430 (e.g., 430A-430D) communicates to a cloud 405 via respective language formats (e.g., web services, XML, API, JDF), and host devices 420A and 420B communicating with cloud 405 via JDF.

Figure 5:
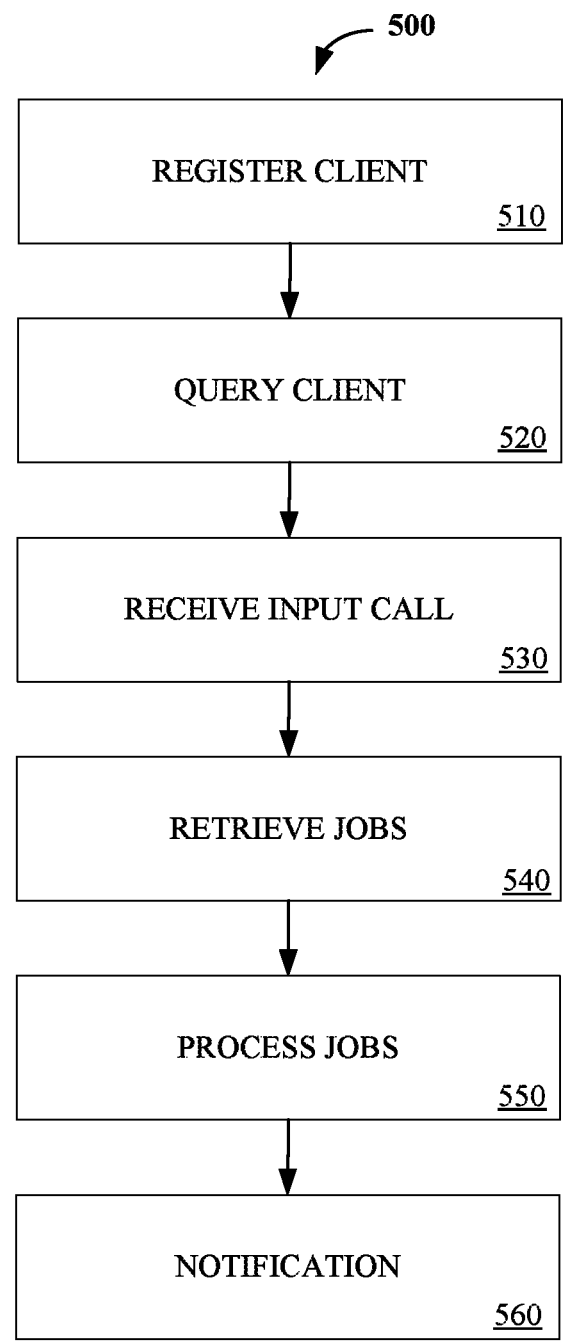
FIG. 5 is a flow diagram illustrating one embodiment of a method for performing application integration.

FIG. 5 is a flow diagram illustrating one embodiment of a process 500 to perform application integration of an external system with a print manager. Process 500 may be performed by processing logic that may comprise hardware (e.g., circuitry, dedicated logic, programmable logic, etc.), software (such as instructions run on a processing device), or a combination thereof. In one embodiment, process 500 may be performed by application integration mechanism 110. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where a client is registered with one or more cloud servers providing an application integration web service. At processing block 520, the client is queried for one or more orders that are to be processed by print manager 205. At processing block 530, an input call is received in response to the query. As discussed above, received input calls may be converted prior to transmission to print manager 205 for processing upon a determination that the client instruction language format is different from that of print manager 205.

At processing block 540, one or more print job orders are retrieved from the client along with the corresponding instructions. In one embodiment, a call is received from print manager to receive orders based on one or more criteria (e.g., date, time, etc.). In response, a service call is issued to the client to request orders based on the provided criteria. According to one embodiment, order identifiers (ID) are received for each order, as well as a job ID for each job in an order to enable print manager 205 to perform error recovery in the event that some jobs are never received.

Figure 6:
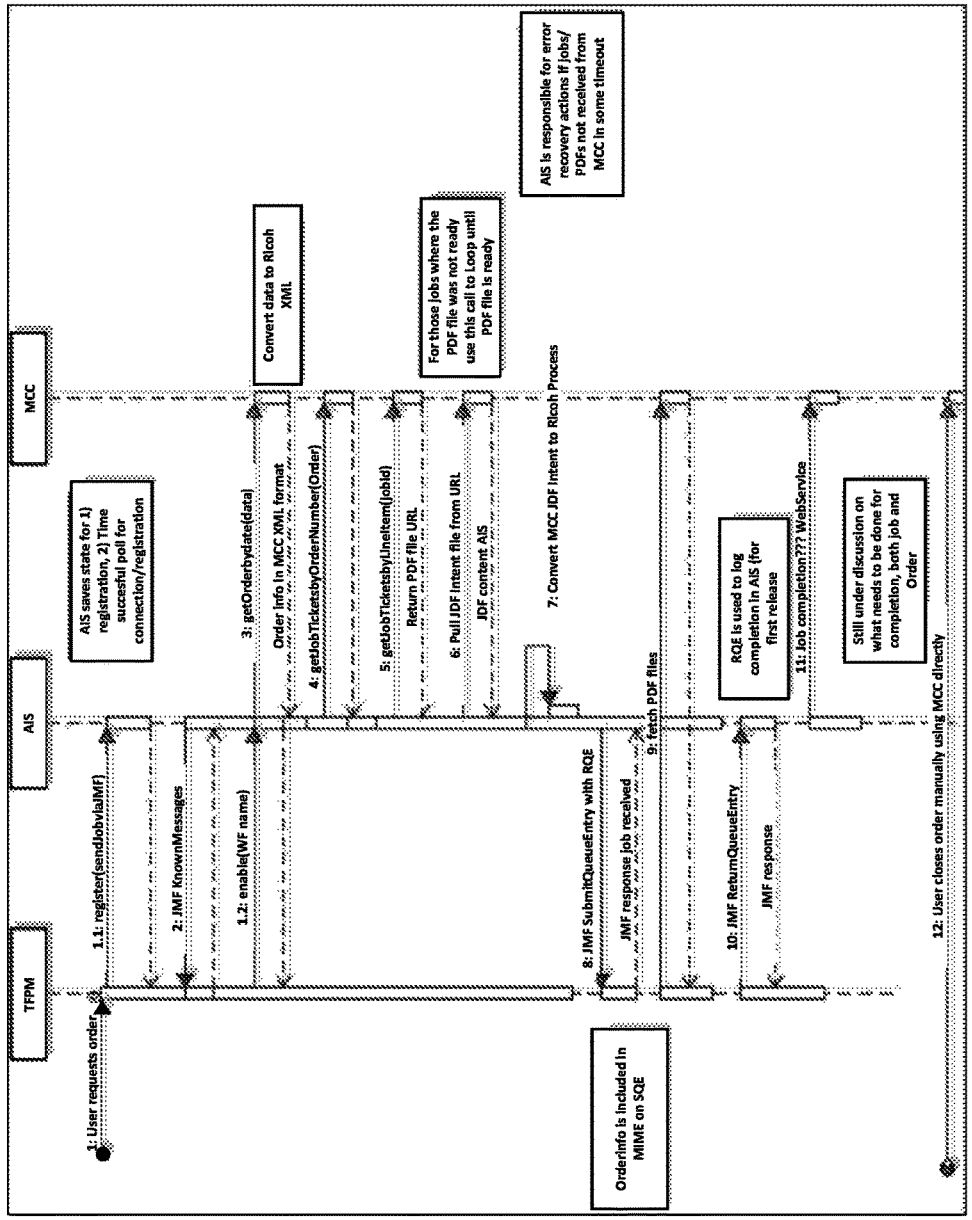
FIG. 6 is a sequence diagram illustrating one embodiment for implementing an application mechanism.

At processing block 550, the job orders are processed. According to one embodiment, a determination is made, based on the instructions, as to whether each received job is printable and an attribute mapping of the instructions for the printable jobs is performed in order to convert the orders to JDF. Subsequently, the print jobs are processed (e.g., printed) at print manager 205 processes the job orders. At processing block 560, a notification is provided to the client indicating that print manager 205 has completed processing the orders. FIG. 6 is a sequence diagram illustrating another embodiment for performing application integration.

The above-described application integration mechanism provides a cloud-based micro services that enables JMF printing to a variety of other industries. For instance, the application integration mechanism enables printers and printing software to communicate in according to the industry standard (e.g., JMF/JDF) while able to communicate across other domains (e.g., web services, Electronic Bill Presentment and Payment (EBPP) provider folder-based solutions, email providers' API-based integrations, etc.) without having to direct conversions.

Figure 7:
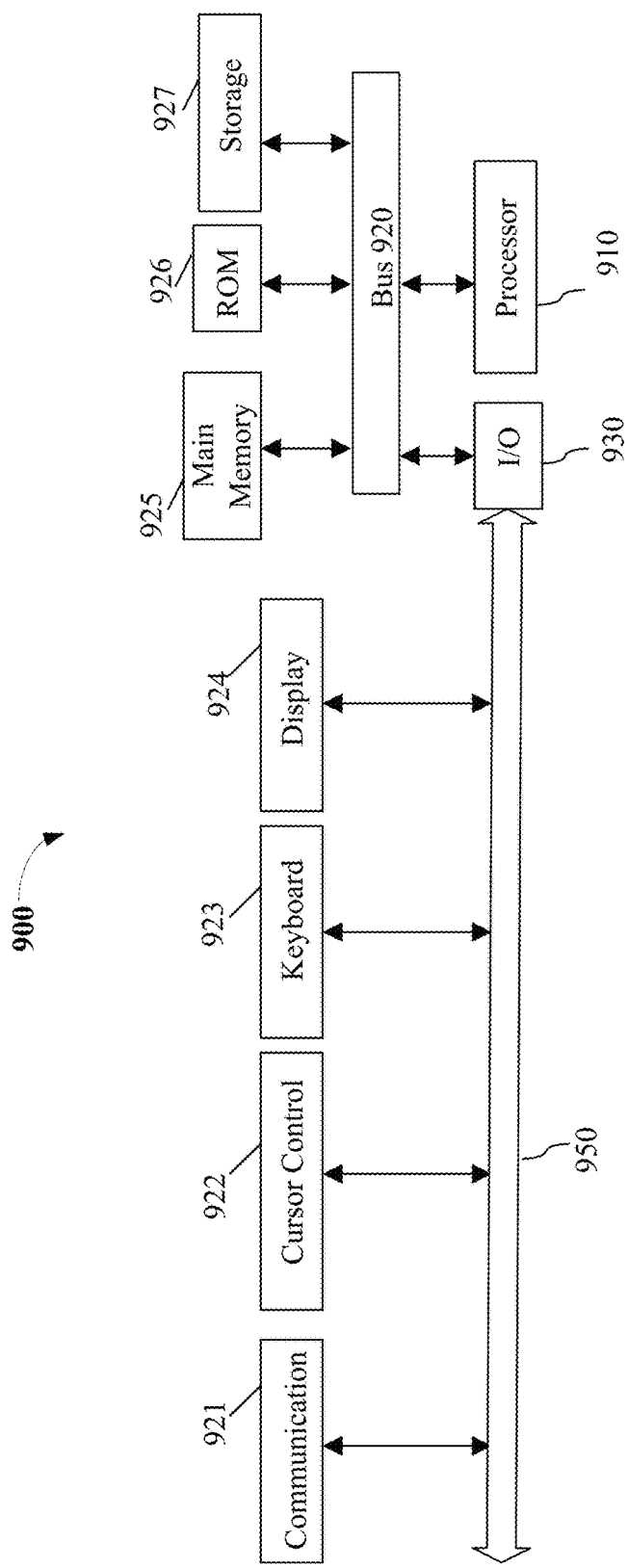
FIG. 7 illustrates a computing device suitable for implementing embodiments of the present disclosure.

FIG. 7 illustrates a computer system 900 on which computing device 120 and/or 121 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A non-transitory computer-readable medium having stored thereon instructions that, when executed by one or more processors, cause the one or more processors to:
receive one or more print job tickets from the client device including instructions to process the one or more print jobs, wherein the instructions are comprised of a first language format;
convert the instructions from the first language format to a second language format, comprising mapping attributes from the first language format to attributes of the second language format;
transmit the instructions for processing the one or more print jobs according to the second language format;
receive a call to retrieve the one or more print jobs in the second language format from the client device based on the instructions;
convert the call from the second language format to the first language format; and
transmit the call to the client device in the first language format.

2. The computer readable medium of claim 1, having stored thereon instructions that, when executed by one or more processors, further cause the one or more processors to register the client device prior to receiving the one or more print job tickets from the client device.

3. The computer readable medium of claim 2, having stored thereon instructions that, when executed by one or more processors, further cause the one or more processors to:
query the client device for the one or more print job tickets that are to be processed by the print manager.

4. The computer readable medium of claim 3, having stored thereon instructions that, when executed by one or more processors, further cause the one or more processors to provide a notification to the client device indicating that the print manager has completed processing the one or more print jobs.

5. The computer readable medium of claim 1, wherein the second language format comprises a Job Definition Format (JDF).

6. The computer readable medium of claim 5, wherein the first language format comprises at least one of: a web services and an application program interface (API).

7. A system comprising:
   at least one physical memory device to store application integration logic; and
   one or more processors coupled with the at least one physical memory device, the one or more processors to execute the application integration logic to provide an interface between a print manager and one or more client devices supporting a plurality of language formats to receive one or more print job tickets from a first client device including instructions to process one or more print jobs, convert the print job instructions from a first language format to a second language format, comprising mapping attributes from the first language format to attributes of the second language format, receive a call to retrieve the one or more print jobs in the second language format from the client device based on the instructions, convert the call from the second language format to the first language format; and transmit the call to the client device in the first language format.

8. The system of claim 7, wherein the application integration logic transmits the print job instructions to the print job manager for processing the one or more print jobs according to the second language format.

9. The system of claim 8, wherein the second language format comprises a Job Definition Format (JDF).

10. The system of claim 9, wherein the first language format comprises at least one of: a web services and an application program interface (API).

11. The system of claim 7, wherein the application integration logic registers the client device prior to receiving the one or more print job tickets from the client device.

12. The system of claim 11, wherein the application integration logic queries the client device for the one or more print job tickets that are to be processed by the print manager.

13. The system of claim 12, wherein the application integration logic provides a notification to the client device indicating that the print manager has completed processing the one or more print jobs.

14. A system comprising:
   one or more host servers to host a print manager to process print jobs according to a host language format;
   a plurality of client servers to submit print job tickets including job instructions to process one or more print jobs at a print job manager, wherein the job instructions submitted by each client server are comprised of different language formats; and
   one or more cloud servers to host application integration logic to provide an interface between the print manager and the plurality of client servers, convert the job instructions from a language format associated with each client server to the host language format, including mapping attributes from the language format associated with each client server to attributes of the host language format, receive a call to retrieve the one or more print jobs in the host-language format from the client device based on the instructions, convert the call from the host-language format to a language format supported by the client device; and transmit the call to the client device in the first language format supported by the client device.

15. The system of claim 14, wherein the application integration logic transmits the print job instructions to the print job manager for processing the one or more print jobs according to the host language format.

16. The system of claim 14, wherein converting print job instructions from a first language format to the host language format comprises mapping attributes from the first language format to attributes of the host language format.

* * * * *